US012800254B2

(12) United States Patent
Valentine

(10) Patent No.: US 12,800,254 B2
(45) Date of Patent: Nov. 17, 2026

(54) EXPLOSIVE ORDINANCE DISPOSAL AND HUMANITARIAN DEMINING TRAINING METHOD AND SYSTEM

(71) Applicant: Charles Alan Valentine, Colonial Beach, VA (US)

(72) Inventor: Charles Alan Valentine, Colonial Beach, VA (US)

( * ) Notice: Subject to any disclaimer, the term of this patent is extended or adjusted under 35 U.S.C. 154(b) by 886 days.

(21) Appl. No.: 18/150,368

(22) Filed: Jan. 5, 2023

(65) Prior Publication Data

US 2024/0230270 A1 Jul. 11, 2024

(51) Int. Cl.
*F41A 33/00* (2006.01)
*G02B 27/01* (2006.01)
*G09B 9/00* (2006.01)

(52) U.S. Cl.
CPC ............ *F41A 33/00* (2013.01); *G02B 27/017* (2013.01); *G09B 9/003* (2013.01)

(58) Field of Classification Search
CPC ........... F41A 33/00; G09B 7/01; G09B 7/017; G09B 9/00; G09B 9/003
See application file for complete search history.

(56) References Cited

U.S. PATENT DOCUMENTS 11,373,383 B2 6/2022 Gates
11,474,596 B1 * 10/2022 Aloisio ............... G06F 11/3093
11,631,339 B2 * 4/2023 Clark ................... G01N 1/2273
11,730,543 B2 * 8/2023 Rios ....................... A61B 34/25
2006/0147890 A1 * 7/2006 Bradford .................. G09B 7/00 434/362
2020/0193150 A1 * 6/2020 Shreve ................... G06V 20/52
2022/0108622 A1 * 4/2022 Derickson .............. G09B 19/00
2023/0104870 A1 * 4/2023 Bailenson ........... G06F 3/04815 715/848

(Continued)

OTHER PUBLICATIONS

James C. Chung, David L. Ryan-Jones, and Eleanor R. N. Robinson, Graphical Systems for Explosive Ordnance Disposal Training, Navy Personnel Research and Development Center, published Oct. 1996.

(Continued)

*Primary Examiner* — Timothy A Musselman
(74) *Attorney, Agent, or Firm* — Carson Patents; Gregory D Carson

(57) ABSTRACT

The explosive ordinance disposal and humanitarian demining training method and system is a product to simulate explosive hazard incidents and instructional material in a repeatable, cost effective, high fidelity data rich environment in order to assess knowledge retention, skills, understanding, and capture lessons learned. The primary focus is perceived realism and ability to export data in a clean and efficient way to simulate an environment and gather the user data to validate learning objectives, identify trends, and diagnose training and environment issues. The intended user of this product will be EOD technicians and humanitarian deminers. The methods and systems of the present invention increase fidelity of a VR/XR training environment by incorporating additional verified data details, elements, features, and relationships between objects and elements into a 3D training environment thereby increasing and improving the fidelity of training scenarios.

16 Claims, 2 Drawing Sheets

(56) References Cited

U.S. PATENT DOCUMENTS

| | | | | |
|---|---|---|---|---|
| 2024/0054816 | A1* | 2/2024 | Kiefer | G06V 10/14 |
| 2025/0014200 | A1* | 1/2025 | Ahmed | G06V 20/56 |

OTHER PUBLICATIONS

Ronald Madrid, Bob Williams, and Joe Holland, Artificial Intelligence for Explosive Ordnance Disposal System (AI-EOD), Los Alamos National Laboratory; Innovative Applications of Artificial Intelligence.

* cited by examiner

EXPLOSIVE ORDINANCE DISPOSAL AND HUMANITARIAN DEMINING TRAINING METHOD AND SYSTEM

BACKGROUND OF THE INVENTION

Technical Field

This invention relates generally to an extended reality (XR) training environment for explosive ordinance disposal (EOD) and humanitarian demining training in the form of a method and a system to provide training for EOD. This invention relates generally to an XR training environment for EOD and humanitarian demining training in the form of a method and a system to assess trainee knowledge retention, skill, understanding, and lessons learned of a trainee. This invention relates generally to an XR training environment for EOD and humanitarian demining training in the form of a method and a system to validate learning objectives, and to diagnose a failure issues involved in training events.

This invention relates specifically to an XR training environment for EOD and humanitarian demining training in the form of a set of methods and a system to provide training for EOD, to assess trainee knowledge retention, skill, understanding, and lessons learned of a trainee, and to validate learning objectives, and to diagnose a failure issues involved in training events. This invention relates specifically to an XR training environment for EOD and humanitarian demining training in the form of a set of methods and a system to provide simulated real world, and real world training for EOD, to assess trainee knowledge retention, skill, understanding, and lessons learned of a trainee, and to validate learning objectives, and to diagnose a failure issues involved in training events.

This invention relates specifically to a set of methods and a system to simulate explosive hazard incidents and instructional material in a repeatable, cost effective, high fidelity data rich environment in order to assess knowledge retention, skills, understanding, and capture lessons learned of trainees and trainers. This invention relates specifically to a set of methods and a system to simulate explosive hazard incidents and instructional material based on real world events and conditions in a repeatable, cost effective, high fidelity data rich environment in order to assess knowledge retention, skills, understanding, and capture lessons learned of trainees and trainers.

This invention relates specifically to a set of methods and a system to capture and create simulated explosive hazard incidents and instructional material in a repeatable, cost effective, high fidelity data rich environment in order to assess knowledge retention, skills, understanding, and capture lessons learned of trainees and trainers. This invention relates specifically to a set of methods and a system to capture and create simulated explosive hazard incidents and instructional material based on real world events and conditions in a repeatable, cost effective, high fidelity data rich environment in order to assess knowledge retention, skills, understanding, and capture lessons learned of trainees and trainers.

Background Art

There are available today only limited implementations of virtual reality (VR) and XR systems that offer training for EOD and humanitarian demining technicians. Specifically there are training environments available for providing an immersive ecosystem comprising a VR headset to display a three-dimensional (3D) rendered environment wherein a user (trainee) interacts with objects in the ecosystem to accomplish training tasks with active sensors, VR controls, and/or operating devices which could be used for EOD skills training. The implementation of 3D assets and dynamic 3D assets could be implemented for EOD skills training to simulate explosive hazard incidents and instructional material for the safe disposing of explosive hazards in a repeatable environment in order to assess trainee knowledge retention, skills, understanding, and capture lessons learned of trainees and trainers.

Available methods and systems include detonation simulation training devices with various incarnations of EOD tasks and skills comprised of various explosive hazards and devices used in the safe disarming, disposition, or detonation of explosive hazards.

Available methods and systems which could be used for EOD skills training further include the introduction of artificial intelligence (AI) to receive and real time responses to 3D assets and dynamic 3D assets. Thus, it would be possible to implement a three-dimensional (3D) rendered environment for teaching EOD skills safely projected into a real world physical space or environment.

The present state of the art is limited to VR and XR systems that could offer training for EOD and humanitarian demining technicians comprising training environments providing an immersive ecosystem with VR/XR headset to display a three-dimensional (3D) rendered environment wherein a user (trainee) interacts with objects in the ecosystem to accomplish EOD dispassion skills training tasks with active sensors, VR controls, and/or operating devices. Such a system could potentially be implemented to assess EOD trainee knowledge retention, skills, understanding, and capture lessons learned of trainees and trainers.

There is not available within the present state of the art a method or system to create high fidelity data rich training 3D rendered environments for teaching EOD skills. There is not available within the present state of the art a method or system to create high fidelity data rich training 3D rendered environments based on or precisely modeled from real world events for teaching EOD skills. Further, there is nothing available with a EOD trainee and EOD trainer feedback inclusion system to improve both the system and the training scenarios used therein in addition to enhancing trainee inclusion and immersion in the training experience.

In light of the foregoing prior art, there is a need for a set of methods and a system to capture and create simulated explosive hazard incidents and instructional material based on real world events and conditions in a repeatable, cost effective, high fidelity data rich environment in order to assess knowledge retention, skills, understanding, and capture lessons learned of trainees and trainers to better train EOD technicians and provide safe, effective, and efficient humanitarian demining training. Further there is a need for a cost effective set of such methods and systems.

BRIEF SUMMARY OF THE INVENTION

The intended application of this product is to simulate explosive hazard incidents and instructional material in a repeatable, cost effective, high fidelity data rich environment in order to assess knowledge retention, skills, understanding, and capture lessons learned. The primary focus is perceived realism and ability to export data in a clean and efficient way to simulate an environment and gather the user data to validate learning objectives, identify trends, and diagnose training and environment issues.

The intended user of this product will be EOD technicians and humanitarian deminers. Special care is taken during development to create an environment that cannot be "broken" or left to interpretation. Precision in detail matters for the tasks associated with safely training EOD technicians and humanitarian deminers to teach new skills and refine existing ones.

Increased fidelity of the training environment offers an idealized solution to teaching EOD skills, functions, and operations. The methods and systems of the present invention increase fidelity of a VR/XR training environment by incorporating additional verified data details, elements, features, and relationships between objects and elements into a 3D training environment thereby increasing and improving the fidelity of training scenarios.

According to a first aspect of the invention there is a method of generating an extended reality (XR) training scenario for explosive ordinance disposal (EOD) training comprising collecting a first open source intelligence (OSI) from available technical diagrams, processing said first OSI to generate a first three-dimensional EOD training element (3D-EOD-TE), collecting a second OSI from available image collections, processing said second OSI to generate a second 3D-EOD-TE, collecting a neural radiance field data, processing said neural radiance field data generate a third 3D-EOD-TE, combining said first 3D-EOD-TE, said second 3D-EOD-TE, and said third 3D-EOD-TE into plurality of 3D-EOD-TE, and creating said XR training scenario by blending said plurality of 3D-EOD-TE into a virtual training environment for teaching EOD skills and techniques to EOD technicians.

Alternative embodiments of the first aspect include an XR training scenario for EOD training further comprising entering a first EOD task as required of an EOD technician having a first plurality of EOD learning objectives, one of said first plurality of EOD learning objectives being an environment search for an explosive device having a first knowledge assessment, a first skill assessment, a first understanding assessment, and a first learning objective, creating a plurality of locations from within said virtual training environment each of said plurality of locations being a set of coordinates associated with each of said first plurality of EOD learning objectives, combining said plurality of locations into said XR training scenario, and assigning a first plurality of success criteria, one of said fruit plurality of success criteria being an objective achieved, to each said first plurality of EOD learning objectives.

Alternative embodiments of the first aspect include an XR training scenario for EOD training may be further comprising a second plurality of EOD learning objectives comprising entering a second EOD task as required of an EOD technician having a second plurality of EOD learning objectives, one of said second plurality of EOD learning objectives being an environment search for an explosive device having a second knowledge assessment, a second skill assessment, a second understanding assessment, and a second learning objective, creating a plurality of locations from within said virtual training environment each of said plurality of locations being a set of coordinates associated with each of said first plurality of EOD learning objectives, combining said plurality of locations into said XR training scenario, and assigning a second plurality of success criteria, one of said second plurality of success criteria being an objective achieved, to each said second plurality of EOD learning objectives.

According to a second aspect of the invention there is a system comprising a user interface, a data corpus, an algorithm, and a processor to implement the method of generating an XR training scenario for EOD training as in the first aspect.

According to a third aspect of the invention there is a method of providing an XR training environment for EOD training to assess a knowledge retention, a skill, an understanding, and a lesson learned of a first trainee and to validate a learning objective, and to diagnose a failure issue involved in a training event by selecting a first training scenario comprising a first EOD task required of an EOD technician having a first plurality of EOD learning objectives, one of said first plurality of EOD learning objectives being an environment search for an explosive device having a first knowledge assessment, a first skill assessment, a first understanding assessment, and a first learning objective, selecting a VR headset and/or an augmented reality (AR) headset, selecting a physical arena comprising a bounded area having a first length and a first width, selecting a playable area having a second length and a second width from within said first length and said first width respectively, playing said first training scenario, recording an exercise performance of said trainee, determining whether said trainee achieved said first plurality of EOD learning objectives by comparing said exercise performance to said knowledge assessment, said skill assessment, said understanding assessment, and said learning objective, generating a training report of success or failure to achieve said first plurality of EOD learning objectives by comparing said exercise performance to said first plurality of EOD learning objectives, and generating a list of performance deviations from said first knowledge assessment, said first skill assessment, said first understanding assessment, and said first learning objective to diagnose a failure condition by comparing said exercise performance to said first plurality of EOD learning objectives.

Alternative embodiments of the third aspect include a method of providing an XR training environment for EOD training further comprising selecting a second training scenario comprising a second EOD task required of an EOD technician having a second plurality of EOD learning objectives, one of said second plurality of EOD learning objectives being an environment search for an explosive device having a second knowledge assessment, a second skill assessment, a second understanding assessment, and a second learning objective, determining whether said trainee achieved said second plurality of EOD learning objectives by comparing said exercise performance to said second knowledge assessment, said second skill assessment, said second understanding assessment, and said second learning objective, generating a training report of success or failure to achieve said second plurality of EOD learning objectives by comparing said exercise performance to said second plurality of EOD learning objectives, and generating a list of performance deviations from said second knowledge assessment, said second skill assessment, said second understanding assessment, and said second earning objective to diagnose a failure condition by comparing said exercise performance to said second plurality of EOD learning objectives.

Alternative embodiments of the third aspect include a method of providing an XR training environment for EOD training wherein said VR headset and said AR headset comprises an eye tracking method, a gaze intensity tracking method, an object tracking method, and/or an image tracking method to enhance said comparing said exercise performance to said plurality of EOD learning objectives.

Alternative embodiments of the third aspect include a method of providing an XR training environment for EOD training wherein said VR headset and said AR headset comprises a haptics method to enhance said comparing said exercise performance to said plurality of EOD learning objectives.

Alternative embodiments of the third aspect include a method of providing an XR training environment for EOD training comprising a pair of VR and/or AR connected controllers or gloves, or a hand gesture tracking system having a plurality of sensors, one of said plurality of sensors being a spatial location device to enhance said comparing said exercise performance to said plurality of EOD learning objectives.

Alternative embodiments of the third aspect include a method of providing an XR training environment for EOD training wherein said pair of VR and/or AR connected controllers or gloves, or a hand gesture tracking system comprises a haptics method to enhance said comparing said exercise performance to said plurality of EOD learning objectives.

Alternative embodiments of the third aspect include a method of providing an XR training environment for EOD training comprising a plurality of trainees to include said first trainee and at least a second trainee and a comparison of said exercise performance of each trainee against said plurality of EOD learning objectives to enable identifying a performance trend in accomplishment of said plurality of EOD learning objectives.

Alternative embodiments of the third aspect include a method of providing an XR training environment for EOD training comprising selecting a plurality of EOD training scenarios to include said first EOD training scenario and at least a second EOD training scenario comprising a second plurality of demining tasks required of an EOD technician having a second plurality of EOD learning objectives, one of said second plurality of EOD learning objectives being an environment search for an explosive device having a second knowledge assessment, a second skill assessment, a second understanding assessment, and a second learning objective.

According to a fourth aspect of the invention there is a XR training system for EOD training to assess a knowledge retention, a skill, an understanding, and a lesson learned of a first trainee and to validate a learning objective, and to diagnose a failure issue involved in a training event comprising a first EOD training scenario comprising a demining task required of an EOD technician having a first plurality of EOD learning objectives, one of said first plurality of EOD learning objectives being an environment search for an explosive device having a first knowledge assessment, a first skill assessment, a first understanding assessment, and a first learning objective, a VR headset and/or an augmented reality (AR) headset, a physical arena comprising a bounded area having a first length and a first width, a playable area having a second length and a second width from within said first length and said first width respectively, a database comprising analysis data, said analysis data comprising said first training scenario, an algorithm, and a processor, wherein said processor uses said algorithm to enable said trainee to exercise said first training scenario, wherein said processor uses said algorithm to record an exercise performance of said trainee, wherein said processor uses said algorithm to determine whether said trainee achieved said first plurality of EOD learning objectives by comparing said exercise performance to said knowledge assessment, said skill assessment, said understanding assessment, and said learning objective, said processor uses said algorithm to generate a training report of success or failure to achieve said first plurality of EOD learning objectives by comparing said exercise performance to said first plurality of EOD learning objectives, and said processor uses said algorithm to generate a list of performance deviations from said first knowledge assessment, said first skill assessment, said first understanding assessment, and said 1 first earning objective to diagnose a failure condition by comparing said exercise performance to said first plurality of EOD learning objectives.

Alternative embodiments of the fourth aspect include a XR training system further comprising a second training scenario comprising a second EOD task required of an EOD technician having a second plurality of EOD learning objectives, one of said second plurality of EOD learning objectives being an environment search for an explosive device having a second knowledge assessment, a second skill assessment, a second understanding assessment, and a second learning objective, determining whether said trainee achieved said second plurality of EOD learning objectives by comparing said exercise performance to said second knowledge assessment, said second skill assessment, said second understanding assessment, and said second learning objective, generating a training report of success or failure to achieve said second plurality of EOD learning objectives by comparing said exercise performance to said second plurality of EOD learning objectives, and generating a list of performance deviations from said second knowledge assessment, said second skill assessment, said second understanding assessment, and said second earning objective to diagnose a failure condition by comparing said exercise performance to said second plurality of EOD learning objectives.

Alternative embodiments of the fourth aspect include a XR training system wherein said algorithm comprises an eye tracking method, a gaze intensity tracking method, an object tracking method, and/or an image tracking method to enhance said comparing said exercise performance to said plurality of EOD learning objectives.

Alternative embodiments of the fourth aspect include a XR training system wherein said algorithm comprises a haptics method to enhance said comparing said exercise performance to said plurality of EOD learning objectives.

Alternative embodiments of the fourth aspect include a XR training system comprising a pair of VR and/or AR connected controllers or gloves comprising a plurality of sensors, one of said plurality of sensors being a spatial location device to enhance said comparing said exercise performance to said plurality of EOD learning objectives.

Alternative embodiments of the fourth aspect include a XR training system wherein said pair of VR and/or AR connected controllers or gloves further comprises a haptics method to enhance said comparing said exercise performance to said plurality of EOD learning objectives.

Alternative embodiments of the fourth aspect include a XR training system comprising a plurality of trainees to include said first trainee and at least a second trainee and a comparison of said exercise performance of each trainee against said plurality of EOD learning objectives to enable identifying a performance trend in accomplishment of said plurality of EOD learning objectives.

Alternative embodiments of the fourth aspect include a XR training system comprising a plurality of EOD training scenarios to include said first EOD training scenario and at least a second EOD training scenario comprising a second plurality of demining tasks required of an EOD technician having a second plurality of EOD learning objectives, one of said second plurality of EOD learning objectives being an environment search for an explosive device having a second knowledge assessment, a second skill assessment, a second understanding assessment, and a second learning objective.

A first advantage of the present invention is that it is a method and system to create high fidelity data rich training 3D rendered environments for teaching EOD skills. A second advantage of the present invention is that it is a method and system to create high fidelity data rich training 3D rendered environments based on or precisely modeled from real world events for teaching EOD skills. A third advantage of the present invention is that it includes an EOD trainee and EOD trainer feedback incorporation system to improve both the system and the training scenarios used therein in addition to enhancing trainee inclusion and immersion in the training experience.

The invention will now be described, by way of example only, with reference to the accompanying drawings in which:

DETAILED DESCRIPTION OF THE INVENTION

Figure 1A:
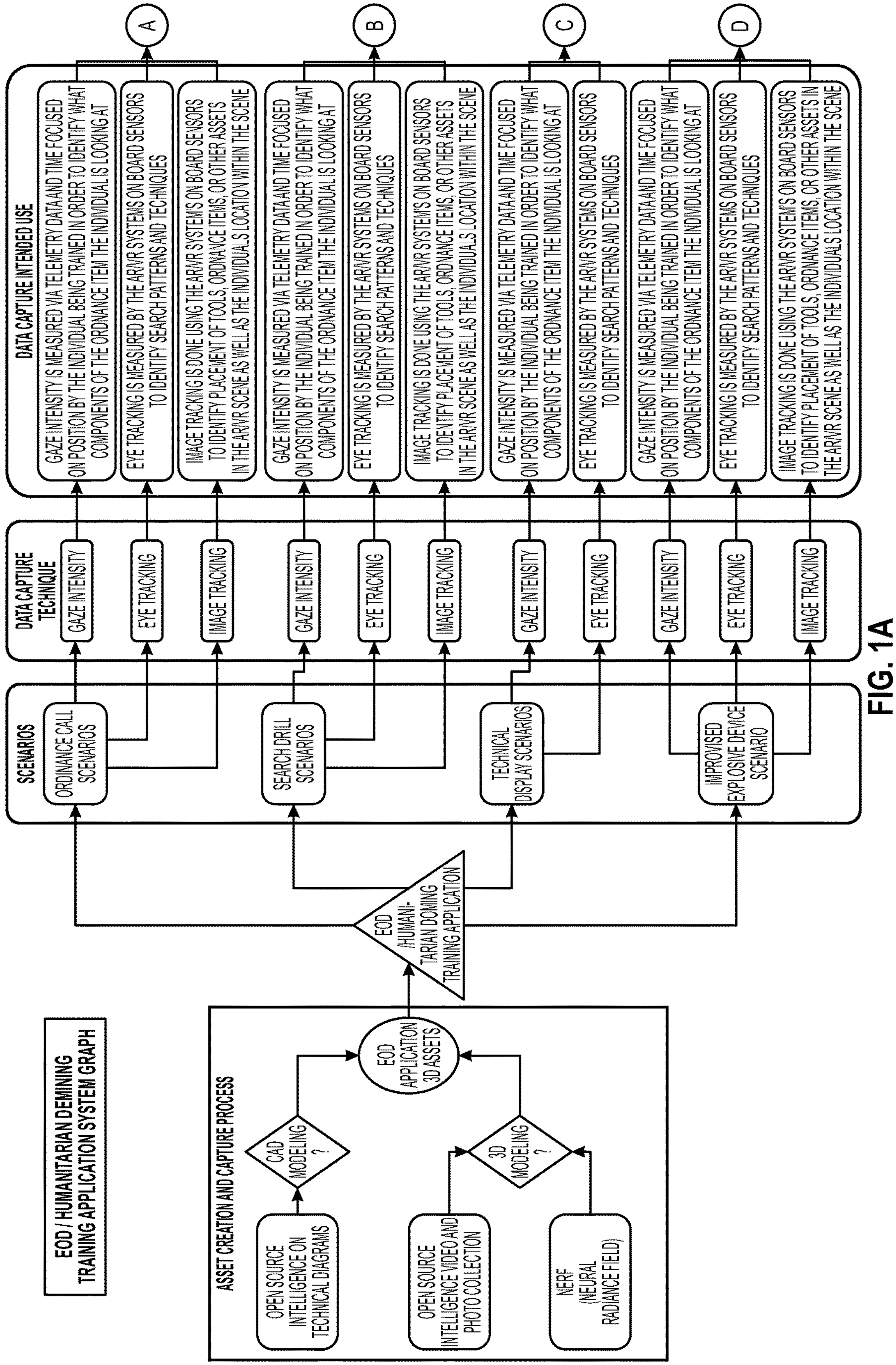
FIG. 1 is a flowchart diagram of the methods according to the invention.
Figure 1B:
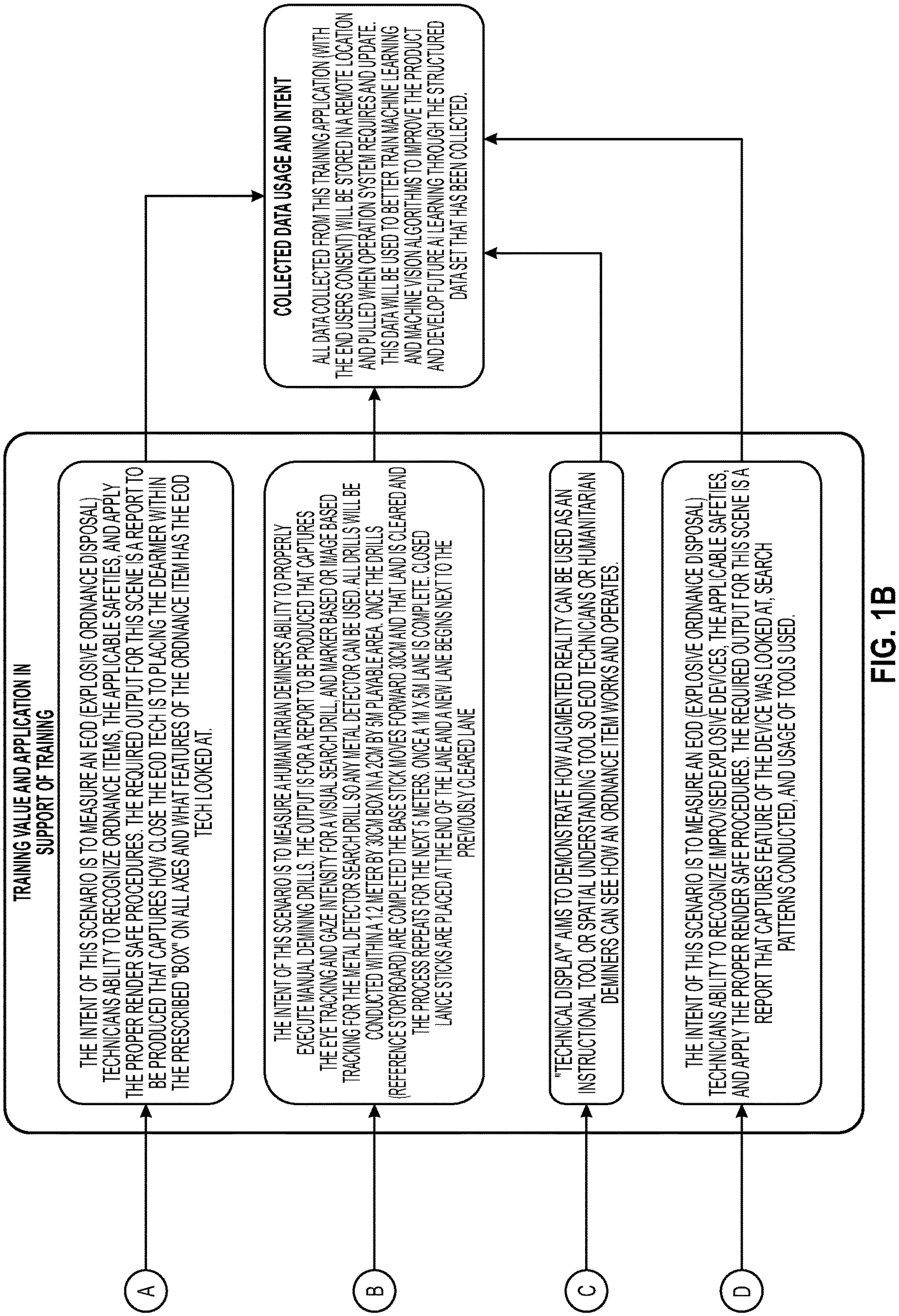

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention. References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Throughout this specification, Extended Reality (XR) will cover both Augmented reality and Virtual Reality systems. Throughout this specification, VR and/or AR connected controllers or gloves, or a hand gesture tracking system that let (enable) a user or trainee interact with the 3D environment and the tasks and skills associated with 3D assets and training objects.

Throughout this specification, the use of an eye tracking method, a gaze intensity tracking method, an object tracking method, and/or an image tracking method are applications or software algorithm enabled features as presently used in XR systems and devices.

Throughout this specification, EOD task is a skill/task to include, but not be limited to, a render safe procedure, a tool work up, a vehicle munition downloading procedure such as that required of an EOD technician having a plurality of EOD learning objectives, one of said plurality of EOD learning objectives being an environment search for an explosive device having a first knowledge assessment, a first skill assessment, a first understanding assessment, and a first learning objective.

There two training scenes or training scenarios examples known as the "Deminer" and "Ordnance Call" tasks. These training scenes and skills elements only provide examples of the EOD training scenes and scenarios that can be used for EOD technician training.

The user or trainee experience called the Deminer Task, is a manual mine clearance process skill. Intended use space measurements 2.5 meters wide by 5.5 meters long scene and working space. The intent of this scenario is to measure a humanitarian deminer's ability to properly execute manual demining drills. The output is used to create a report to be produced by the invention that captures the eye tracking and gaze intensity for a visual search drill, and marker based tracking for the metal detector search drill. All drills will be conducted within a 1.2 meters by 30 centimeter box in a 2 meters by 5 meters playable area. Once the drills are completed the base stick moves forward 30 centimeters and that land is cleared and the process repeats for the next 5 meters. Once a 1 meter by 5 meters lane is complete, closed lane sticks are placed at the end of the lane and a new lane begins next to the previously cleared lane.

Steps to a manual mine clearance process.

1) Visual Search (Mandatory Feedback): A deminer begins this drill by observing the 1.2 meters wide area in front of the base stick at 15 meters, 10 meters, and 5 meters. Next phase of the Visual Search is visually inspecting the 1.2 meters by 30 centimeters area immediately in front of the base stick. See flowchart for contextual information.
2) Tripwire search (Optional Drill): Observing the area in front of the base stick, the deminer will extend a 2-3 millimeter wire that is 60 millimeters long on the left, center, and right of the clearance lane and raising it above head height feeling and looking for a tripwire.
3) Vegetation Cut (Optional Drill): Using a manual hedge trimmer or pruning shears, the deminer will remove all vegetation from the 1.2 meters by 30 centimeters space in front of the base stick. The deminer will cut 5 centimeters of height from the vegetation in this space until the vegetation is about 5 centimeters tall from the ground.
4) Metal Detector Search (Mandatory Feedback): A deminer will begin this drill by extending the metal detector head halfway across the base stick and making a full sweep across the base stick. Once this is complete the deminer will move the metal detector head so it is now fully over the base stick and in the opposite direction, will proceed with a sweep across the 1.2 meters by 30 centimeters area. Finally, the deminer will move the metal detector head another half a metal detector heads length forward and in the opposite direction, will proceed with the final sweep across the 1.2 meters by 30 centimeters area. Additionally, the metal detector head must remain parallel to the ground.

Visual objects, or 3D assets with associated tasks for the deminer task include: Marking Stakes—must have the ability to be moved, added, and removed from scene; Base Stick—must be movable; and Search Drill instructions/Checkable Checklist.

Functionality monitored and used in analysis and feedback for the deminer task include: Ability to Eye Track and conduct Gaze Intensity analysis with exportable or viewable output; and Ability to ensure demining drills are physically completed and provide warning or feedback if drill is not completed.

Technical display scenario is displayable in three manners; solid item—scalable and manipulatable in space; cutaway—scalable and manipulatable in space; and Exploded View—ability to "pull" the item apart to see the components with call out boxes that appear at a specified "pull" distance and labels the components.

The user or trainee experience called the Ordnance Call Task is an ordnance recognition and render safe EOD technician skill. The intended use space measurements 1 meter by 1 meter working space. The intent of this scenario is to measure an EOD technicians' ability to recognize ordnance items, the applicable ordinance items safeties, and apply the proper render safe procedures. The output for this scene is a report to be produced that captures how close the EOD tech is to placing the dearmer or tool within the prescribed "box" on all axes and what features of the ordnance item has the EOD tech looked at.

During an actual ordnance call an EOD tech is required to identify the ordnance and the condition the item is in (armed, unarmed, partially armed). An EOD tech does this by looking at the item and its key features (nomenclature, markings, scorching, deployed components, discarded components). Once that is complete the EOD tech will either use their experience, understanding of fuze functioning, and/or publication to determine what condition the item is in and the proper disposal or render safe procedure.

Visual objects, or 3D assets with associated actions for the ordnance call task include: Explosive Ordnance (Artillery round that is fired with fuze)—Stationary; and Dearmer—moveable, ability to call asset via wrist menu, ability to analyze if the time was placed in proper location and within tolerances.

Action and functionality monitored and used in analysis and feedback functions of the present invention include input from all connected systems and devices to include but not be limited to at least: the virtual movement (physical relocation) of objects and/or assists, a pair of VR and/or AR connected controllers or gloves, or a hand gesture tracking system, eye tracking systems, and gaze intensity software and systems to ensure accuracy of task completion.

Training scenario asset creation and capture process enabling the use of real world data. Technical drawings are processed through CAD modeling software to create 3D environment training scenario assets for EOD technician training. Video and photo collections are processed through 3D modeling software to create 3D environment training scenario asset for EOD technician training. Neural Radiance Field (NeRF) are processed through 3D modeling software to create 3D environment training scenario asset for EOD technician training.

Training scenario assets are the scenarios used for EOD training combined with data capture techniques such as an eye tracking method, a gaze intensity tracking method, an object tracking method, and/or an image tracking method. The data captured is then used in support of adding value to and support in detailed analysis of task accomplishment compared to the standards of successful performance. Further, the data captured is used by machine learning and machine vision algorithms to improve the training scenario and suggest additional training elements and or training scenarios.

In a preferred embodiment of the present invention, there is a method of generating an extended reality (XR) training scenario for explosive ordinance disposal (EOD) training comprising collecting a first open source intelligence (OSI) from available technical diagrams, processing said first OSI to generate a first three-dimensional EOD training element (3D-EOD-TE), collecting a second OSI from available image collections, processing said second OSI to generate a second 3D-EOD-TE, collecting a neural radiance field data, processing said neural radiance field data generate a third 3D-EOD-TE, combining said first 3D-EOD-TE, said second 3D-EOD-TE, and said third 3D-EOD-TE into plurality of 3D-EOD-TE, and creating said XR training scenario by blending said plurality of 3D-EOD-TE into a virtual training environment for teaching EOD skills and techniques to EOD technicians.

Alternative embodiments include an XR training scenario for EOD training further comprising entering a first EOD task as required of an EOD technician having a first plurality of EOD learning objectives, one of said first plurality of EOD learning objectives being an environment search for an explosive device having a first knowledge assessment, a first skill assessment, a first understanding assessment, and a first learning objective, creating a plurality of locations from within said virtual training environment each of said plurality of locations being a set of coordinates associated with each of said first plurality of EOD learning objectives, combining said plurality of locations into said XR training scenario, and assigning a first plurality of success criteria, one of said fruit plurality of success criteria being an objective achieved, to each said first plurality of EOD learning objectives.

Alternative embodiments include an XR training scenario for EOD training may be further comprising a second plurality of EOD learning objectives comprising entering a second EOD task as required of an EOD technician having a second plurality of EOD learning objectives, one of said second plurality of EOD learning objectives being an environment search for an explosive device having a second knowledge assessment, a second skill assessment, a second understanding assessment, and a second learning objective, creating a plurality of locations from within said virtual training environment each of said plurality of locations being a set of coordinates associated with each of said first plurality of EOD learning objectives, combining said plurality of locations into said XR training scenario, and assigning a second plurality of success criteria, one of said second plurality of success criteria being an objective achieved, to each said second plurality of EOD learning objectives.

In a preferred embodiment of the present invention, there is a system comprising a user interface, a data corpus, an algorithm, and a processor to implement the method of generating an XR training scenario for EOD training as in the first aspect.

In a preferred embodiment of the present invention, there is a method of providing an XR training environment for EOD training to assess a knowledge retention, a skill, an understanding, and a lesson learned of a first trainee and to validate a learning objective, and to diagnose a failure issue involved in a training event by selecting a first training scenario comprising a first EOD task required of an EOD technician having a first plurality of EOD learning objectives, one of said first plurality of EOD learning objectives being an environment search for an explosive device having a first knowledge assessment, a first skill assessment, a first understanding assessment, and a first learning objective, selecting a VR headset and/or an augmented reality (AR) headset, selecting a physical arena comprising a bounded area having a first length and a first width, selecting a playable area having a second length and a second width from within said first length and said first width respectively, playing said first training scenario, recording an exercise performance of said trainee, determining whether said trainee achieved said first plurality of EOD learning objectives by comparing said exercise performance to said knowledge assessment, said skill assessment, said understanding assessment, and said learning objective, generating a training report of success or failure to achieve said first plurality of EOD learning objectives by comparing said exercise performance to said first plurality of EOD learning objectives, and generating a list of performance deviations from said first knowledge assessment, said first skill assessment, said first understanding assessment, and said first learning objective to diagnose a failure condition by comparing said exercise performance to said first plurality of EOD learning objectives.

Alternative embodiments include a method of providing an XR training environment for EOD training further comprising selecting a second training scenario comprising a second EOD task required of an EOD technician having a second plurality of EOD learning objectives, one of said second plurality of EOD learning objectives being an environment search for an explosive device having a second knowledge assessment, a second skill assessment, a second understanding assessment, and a second learning objective, determining whether said trainee achieved said second plurality of EOD learning objectives by comparing said exercise performance to said second knowledge assessment, said second skill assessment, said second understanding assessment, and said second learning objective, generating a training report of success or failure to achieve said second plurality of EOD learning objectives by comparing said exercise performance to said second plurality of EOD learning objectives, and generating a list of performance deviations from said second knowledge assessment, said second skill assessment, said second understanding assessment, and said second earning objective to diagnose a failure condition by comparing said exercise performance to said second plurality of EOD learning objectives.

Alternative embodiments of the third aspect include a method of providing an XR training environment for EOD training wherein said VR headset and said AR headset comprises an eye tracking method, a gaze intensity tracking method, an object tracking method, and/or an image tracking method to enhance said comparing said exercise performance to said plurality of EOD learning objectives.

Alternative embodiments include a method of providing an XR training environment for EOD training wherein said VR headset and said AR headset comprises a haptics method to enhance said comparing said exercise performance to said plurality of EOD learning objectives.

Alternative embodiments include a method of providing an XR training environment for EOD training comprising a pair of VR and/or AR connected controllers or gloves having a plurality of sensors, one of said plurality of sensors being a spatial location device to enhance said comparing said exercise performance to said plurality of EOD learning objectives.

Alternative embodiments of the third aspect include a method of providing an XR training environment for EOD training wherein said pair of VR and/or AR connected controllers or gloves comprises a haptics method to enhance said comparing said exercise performance to said plurality of EOD learning objectives.

Alternative embodiments include a method of providing an XR training environment for EOD training comprising a plurality of trainees to include said first trainee and at least a second trainee and a comparison of said exercise performance of each trainee against said plurality of EOD learning objectives to enable identifying a performance trend in accomplishment of said plurality of EOD learning objectives.

Alternative embodiments include a method of providing an XR training environment for EOD training comprising selecting a plurality of EOD training scenarios to include said first EOD training scenario and at least a second EOD training scenario comprising a second plurality of demining tasks required of an EOD technician having a second plurality of EOD learning objectives, one of said second plurality of EOD learning objectives being an environment search for an explosive device having a second knowledge assessment, a second skill assessment, a second understanding assessment, and a second learning objective.

In a preferred embodiment of the present invention, there is a XR training system for EOD training to assess a knowledge retention, a skill, an understanding, and a lesson learned of a first trainee and to validate a learning objective, and to diagnose a failure issue involved in a training event comprising a first EOD training scenario comprising a demining task required of an EOD technician having a first plurality of EOD learning objectives, one of said first plurality of EOD learning objectives being an environment search for an explosive device having a first knowledge assessment, a first skill assessment, a first understanding assessment, and a first learning objective, a VR headset and/or an augmented reality (AR) headset, a physical arena comprising a bounded area having a first length and a first width, a playable area having a second length and a second width from within said first length and said first width respectively, a database comprising analysis data, said analysis data comprising said first training scenario, an algorithm, and a processor, wherein said processor uses said algorithm to enable said trainee to exercise said first training scenario, wherein said processor uses said algorithm to record an exercise performance of said trainee, wherein said processor uses said algorithm to determine whether said trainee achieved said first plurality of EOD learning objectives by comparing said exercise performance to said knowledge assessment, said skill assessment, said understanding assessment, and said learning objective, said processor uses said algorithm to generate a training report of success or failure to achieve said first plurality of EOD learning objectives by comparing said exercise performance to said first plurality of EOD learning objectives, and said processor uses said algorithm to generate a list of performance deviations from said first knowledge assessment, said first skill assessment, said first understanding assessment, and said 1 first earning objective to diagnose a failure condition by comparing said exercise performance to said first plurality of EOD learning objectives.

Alternative embodiments include a XR training system further comprising a second training scenario comprising a second EOD task required of an EOD technician having a second plurality of EOD learning objectives, one of said second plurality of EOD learning objectives being an environment search for an explosive device having a second knowledge assessment, a second skill assessment, a second understanding assessment, and a second learning objective, determining whether said trainee achieved said second plurality of EOD learning objectives by comparing said exercise performance to said second knowledge assessment, said second skill assessment, said second understanding assessment, and said second learning objective, generating a training report of success or failure to achieve said second plurality of EOD learning objectives by comparing said exercise performance to said second plurality of EOD learning objectives, and generating a list of performance deviations from said second knowledge assessment, said second skill assessment, said second understanding assessment, and said second earning objective to diagnose a failure condition by comparing said exercise performance to said second plurality of EOD learning objectives.

Alternative embodiments include a XR training system wherein said algorithm comprises an eye tracking method, a gaze intensity tracking method, an object tracking method, and/or an image tracking method to enhance said comparing said exercise performance to said plurality of EOD learning objectives.

Alternative embodiments include a XR training system wherein said algorithm comprises a haptics method to enhance said comparing said exercise performance to said plurality of EOD learning objectives.

Alternative embodiments include a XR training system comprising a pair of VR and/or AR connected controllers or gloves, or a hand gesture tracking system comprising a plurality of sensors, one of said plurality of sensors being a spatial location device to enhance said comparing said exercise performance to said plurality of EOD learning objectives.

Alternative embodiments include a XR training system wherein said pair of VR and/or AR connected controllers or gloves, or a hand gesture tracking system further comprises a haptics method to enhance said comparing said exercise performance to said plurality of EOD learning objectives.

Alternative embodiments include a XR training system comprising a plurality of trainees to include said first trainee and at least a second trainee and a comparison of said exercise performance of each trainee against said plurality of EOD learning objectives to enable identifying a performance trend in accomplishment of said plurality of EOD learning objectives.

Alternative embodiments include a XR training system comprising a plurality of EOD training scenarios to include said first EOD training scenario and at least a second EOD training scenario comprising a second plurality of demining tasks required of an EOD technician having a second plurality of EOD learning objectives, one of said second plurality of EOD learning objectives being an environment search for an explosive device having a second knowledge assessment, a second skill assessment, a second understanding assessment, and a second learning objective.

A first advantage of the present invention is that it is a method and system to create high fidelity data rich training 3D rendered environments for teaching EOD skills. The addition and combination of open source intelligence from technical diagrams, video and photo collections, and neural radiance field data processed through CAD and/or 3D modeling software and systems to augment and verify 3D assets used in XR training scenarios serves to increase and improve the fidelity of the training environment and scenario. The combination of all three of these fidelity improvements yields a high fidelity data rich environment and scenario.

A second advantage of the present invention is that it is a method and system to create high fidelity data rich training 3D rendered environments based on or precisely modeled from real world events for teaching EOD skills. The addition and combination of open source intelligence in technical diagrams, photos, videos, and neural radiance field data processed through CAD and/or 3D modeling software and systems to augment and verify 3D assets used in real world based, created, or modeled XR training scenarios serves to increase and improve the fidelity of the training environment and scenario. The combination of all three of these fidelity improvements yields a high fidelity data rich environment and scenario.

A third advantage of the present invention is that it includes an EOD trainee and EOD trainer feedback incorporation system to improve both the system and the training scenarios used therein in addition to enhancing trainee inclusion and immersion in the training experience. The addition of an interactive feedback system to obtain and include feedback from trainees and trainers is used by the present invention, with or without the addition of AI technologies and techniques, serves to enhancing trainee and trainer inclusion and immersion in the training experience and to improve the environment, 3D assets, training assets, and the training scenarios used in the training experience.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. An extended reality (XR) training system for explosive ordnance disposal (EOD) training comprising:

a database storing scenario data derived from open-source intelligence, image collections, and neural-radiance-field data combined into high-fidelity three-dimensional EOD training elements;

a processor executing an algorithm configured to record trainee performance data from eye-tracking, gaze, spatial, and haptic sensors, compare said trainee performance data to a plurality of EOD learning objectives, and generate an adaptive diagnostic report that identifies failure causes and updates subsequent scenarios; and a virtual reality (VR) interface and/or an augmented reality (AR) interface presenting an EOD training scenario within a bounded physical arena.

2. The system of claim 1, wherein said algorithm determines whether a trainee achieved said plurality of EOD learning objectives by comparing a captured performance data to stored knowledge, skill, and understanding assessments.

3. The system of claim 1, wherein said processor generates a training report identifying performance trends among a plurality of trainees to validate said plurality of EOD learning objectives.

4. The system of claim 1, wherein said algorithm adjusts one or more environmental parameters in subsequent scenarios responsive to said adaptive diagnostic report.

5. The system of claim 1, further comprising a plurality of EOD training scenarios configured to compare said trainee performance data to identify performance trends across scenarios.

6. The system of claim 1, wherein said adaptive diagnostic report comprises cause-specific performance deviation indicators for each of said plurality of EOD learning objectives.

7. The system of claim 1, wherein said processor exports said trainee performance data and a diagnostic result for external review and validation of training effectiveness.

8. A method of generating a high-fidelity extended-reality (XR) training scenario for explosive ordnance disposal (EOD) training comprising:

collecting open-source intelligence (OSI) from technical diagrams, image collections, and neural-radiance-field (NeRF) datasets;

fusing said OSI from technical diagrams, said image collections, and said NeRF datasets into a unified volumetric model of an EOD object or an EOD environment by spatially registering corresponding data features;

verifying said unified volumetric model against a stored physical ordnance geometry data; and creating said high-fidelity XR training scenario by blending said unified volumetric model into a virtual training environment linked to a plurality of EOD learning objectives and a success criteria.

9. The method of claim 8, further comprising processing said unified volumetric model through a 3D modeling software system to ensure consistency of dimensional accuracy and texture fidelity.

10. The method of claim 8, wherein said high-fidelity XR training scenario is verified using a comparison between virtual ordnance models and known physical geometry datasets.

11. The method of claim 8, wherein said high-fidelity XR training scenario includes a plurality of locations, each of said plurality of locations corresponding to a coordinate set associated with a specific EOD learning objective.

12. The method of claim 8, wherein each of said plurality of EOD learning objectives includes a specific success criteria defining objective completion thresholds for knowledge, skill, and understanding assessments.

13. The method of claim 8, wherein said high-fidelity XR training scenario is further linked to a trainee performance data for validation of said plurality of EOD learning objectives.

14. The method of claim 8, further comprising storing said OSI from technical diagrams, said image collections, and said NeRF datasets after fusing within a database for reuse and iterative refinement of future EOD training scenarios.

15. A method of providing an extended reality (XR) training environment for explosive ordnance disposal (EOD) training to assess knowledge retention, skill, understanding, and lessons learned of a trainee and to diagnose a failure condition, comprising:

selecting an EOD training scenario comprising at least one EOD task having a plurality of EOD learning objectives, each objective having an associated knowledge, skill, and understanding assessment and success criterion;

selecting a virtual reality (VR) headset and/or an augmented reality (AR) headset and a bounded physical arena having a defined playable area;

executing said EOD training scenario within said XR training environment while capturing a multimodal performance data including eye-tracking, gaze-intensity, spatial-location, and task-completion signals;

comparing a captured performance data to said plurality of EOD learning objectives using an algorithm trained with prior EOD task data to determine a plurality of deviations; and generating an adaptive diagnostic report identifying cause-specific performance deviations and automatically adjusting at least one parameter of a subsequent training scenario based on said plurality of deviations;

wherein said algorithm includes a spatial tracking data captured from VR-connected or AR-connected controllers, gloves, or hand-gesture tracking systems.

16. A method of providing an extended reality (XR) training environment for explosive ordnance disposal (EOD) training to assess knowledge retention, skill, understanding, and lessons learned of a trainee and to diagnose a failure condition, comprising:

selecting an EOD training scenario comprising at least one EOD task having a plurality of EOD learning objectives, each objective having an associated knowledge, skill, and understanding assessment and success criterion;

selecting a virtual reality (VR) headset and/or an augmented reality (AR) headset and a bounded physical arena having a defined playable area;

executing said EOD training scenario within said XR training environment while capturing a multimodal performance data including eye-tracking, gaze-intensity, spatial-location, and task-completion signals;

comparing a captured performance data to said plurality of EOD learning objectives using an algorithm trained with prior EOD task data to determine a plurality of deviations; and generating an adaptive diagnostic report identifying cause-specific performance deviations and automatically adjusting at least one parameter of a subsequent training scenario based on said plurality of deviations;

further comprising recording real-time feedback from said trainee and a trainer during execution of said EOD task for inclusion in said adaptive diagnostic report.

* * * * *